United States Patent
Kramer et al.

(10) Patent No.: US 8,186,763 B2
(45) Date of Patent: May 29, 2012

(54) ROAD MILLING MACHINE

(75) Inventors: Thomas Kramer, Köln (DE); Christian Berning, Zulpich (DE); Peter Busley, Linz/Rhein (DE)

(73) Assignee: Wirtgen GmbH (DE)

( * ) Notice: Subject to any disclaimer, the term of this patent is extended or adjusted under 35 U.S.C. 154(b) by 339 days.

(21) Appl. No.: 12/564,202

(22) Filed: Sep. 22, 2009

(65) Prior Publication Data

US 2010/0090517 A1    Apr. 15, 2010

(30) Foreign Application Priority Data

Oct. 9, 2008    (DE) .................. 20 2008 013 393 U

(51) Int. Cl.
*E06C 5/04*    (2006.01)
(52) U.S. Cl. ........................................ 299/39.4; 182/127
(58) Field of Classification Search ............... 299/39.4; 182/127
See application file for complete search history.

(56) References Cited

U.S. PATENT DOCUMENTS

| | | | | |
|---|---|---|---|---|
| 3,190,392 A | * | 6/1965 | Ashton et al. | 182/97 |
| 5,024,292 A | * | 6/1991 | Gilbreath et al. | 182/90 |
| 5,046,582 A | * | 9/1991 | Albrecht | 182/127 |
| 5,893,677 A | * | 4/1999 | Haehn et al. | 404/90 |
| 5,988,316 A | * | 11/1999 | Hedley | 182/127 |
| 6,029,775 A | * | 2/2000 | Hedley et al. | 182/127 |
| 6,640,929 B2 | * | 11/2003 | Korpi | 182/127 |
| 2006/0070804 A1 | * | 4/2006 | Lapke et al. | 182/127 |

FOREIGN PATENT DOCUMENTS

CN    201045779 Y    4/2008
WO    WO 2007062464 A1 *   6/2007

OTHER PUBLICATIONS

Admitted prior art per paragraph [0007] of the application as filed.
Admitted prior art per paragraph [0008] of the application as filed.
Office Action in Chinese Application No. 200910171941.0 (not prior art).

* cited by examiner

*Primary Examiner* — John Kreck
(74) *Attorney, Agent, or Firm* — Waddey & Patterson, P.C.; Lucian Wayne Beavers

(57) ABSTRACT

The invention relates to a road-milling machine which has a ladder 11 to allow the driver's position 7 of the civil engineering machine to be climbed to easily. The ladder is mounted on one 1B of the two longitudinal sides of the frame 1 of the machine to be pivotable about an axis of pivot 27 extending substantially at right angles to the direction of travel. The ladder can thus be folded upwards to widen the working range of the machine. However, should the ladder not be in a state where it is folded upwards while the machine is being used to do work, the ladder cannot be damaged against obstacles which suddenly make an appearance in the working range. Should the ladder hit against an obstacle, the ladder is able to move out of the way of the obstacle by pivoting out of the vertical position in the opposite direction to the direction of travel. A further advantage of the ladder lies in the fact that the ladder can easily be folded upwards or downwards not only from the ground but also from the driver's position.

21 Claims, 7 Drawing Sheets

ROAD MILLING MACHINE

This application claims benefit of German Patent Application DE 20 2008 013 393.9, filed Oct. 9, 2008.

BACKGROUND OF THE INVENTION

1. Field of the Invention

The invention relates to a road-milling machine.

2. Description of the Prior Art

Civil engineering machines of different designs are known for underground and above-ground construction. What are used for the construction of roads are self-propelled road-building machines, which include for example known road-milling machines. Known road-milling machines have a driver's position for the driver of the machine.

Because of the relatively large dimensions of road-milling machines, the driver's position is arranged at a relatively great height above the ground. For climbing to the driver's position, road-milling machines therefore have a ladder which is arranged on one side of the frame of the machine below the driver's position. To make the climb to the driver's position easier, the ladder should reach to a point which is as close as possible to the ground. The ladder should also be spaced sufficiently far away from the frame of the machine to ensure that when the driver of the machine is climbing to the driver's position there is no danger of his coming into contact with parts of the machine which may possibly even be moving.

Basically, a ladder is disadvantageous in that it increases the width of the machine for transport. This is particularly the case when, for reasons of safety, the ladder is arranged at a sufficiently large spacing from the frame of the machine.

It is also a disadvantage that the ladder arranged on the side of the frame of the machine is a fundamental restriction on the working range of the machine. Even when the machine is kept sufficiently far away from lateral boundaries such for example as a wall or the like, there is still the further danger of the ladder colliding with obstacles which suddenly make an appearance within the working range. If this happens, the ladder may be ripped from its anchorage or even destroyed.

There are known road-milling machines in which the problem of reducing the width for transport is solved by fastening the ladder to the frame of the machine with a parallelogram linkage. The parallelogram linkage allows the ladder to be folded in against the frame of the machine, thus reducing the width for transport. It is however a disadvantage that the parallelogram linkage calls for a relatively complicated structure.

As well as this, what are also known are road-milling machines which have a foldable ladder which comprises two sub-sections which are connected together by joints. The two stiles of the bottom sub-section of the ladder are fastened to the stiles of the top sub-section of the ladder by rotary joints, thus enabling the bottom sub-section to be pivoted about an axis which extends in the direction of travel. When the ladder is folded upwards, there is no restriction on the working range of the machine, nor is there any danger of the ladder colliding with obstacles. However, when the driver of the machine is at the driver's position it is not easy for him to fold the ladder upwards, even though the bottom sub-section of the ladder could still be folded upwards without any problems from the ground. However, if the ladder is not folded upwards, there is still a risk of the ladder suffering damage against obstacles which suddenly make an appearance.

SUMMARY OF THE INVENTION

An object underlying the invention is to provide a road-milling machine which has a ladder for the driver's position which can be produced inexpensively and which is particularly easy to deal with.

This object is achieved in accordance with the invention by virtue of the features of the independent claims. Advantageous embodiments of the invention form the subject matter of the dependent claims.

In the case of the road-milling machine according to the invention, the ladder is mounted on one or both longitudinal sides of the frame of the machine to be pivotable about an axis of pivot extending substantially at right angles to the direction of travel. The ladder can thus be folded upwards to widen the working range of the machine. However, should the ladder not be in a state where it is folded upwards while the machine is being used to do work, the ladder cannot be damaged against obstacles which suddenly make an appearance in the working range. Should the ladder hit against an obstacle, the ladder is able to move out of the way of the obstacle by pivoting out of the vertical position. When this happens, the portion of the ladder which is situated below the axis of pivot is pivoted out of the vertical position in the opposite direction to the direction of travel.

A further advantage of the pivotable ladder of the road-milling machine according to the invention lies in the fact that the ladder can easily be folded upwards or downwards not only from the ground but also from the driver's position.

The ladder may comprise one or more sub-sections. The ladder itself may even be a ladder which can be folded together. It is preferred that the ladder is mounted on the frame of the machine to be pivotable about an axis extending substantially at right angles to the direction of travel.

In a preferred embodiment, provision is made for the axis of pivot extending substantially at right angles to the direction of travel to be tilted from the horizontal relative to the vertical longitudinal side in such a way that the ladder is at a slope relative to the longitudinal side of the frame of the machine, i.e. that the ladder is leant against the side-wall of the frame of the machine. The axis of pivot of the ladder may stand in an orthogonal position on the plane which is defined by the ladder in this case. On the one hand, what is achieved in this way is that in the vertical position the ladder is sloped forward in the direction of ascent relative to the vertical frame of the machine, which makes climbing aboard easier from the ergonomic point of view. What on the other hand is achieved in this way is that in the vertical position the ladder is spaced sufficiently far away from the parts of the machine which are arranged in the bottom region along the longitudinal side of the machine, which are generally moving. There is no need for a parallelogram linkage of complicated construction to increase the distance between the ladder and the frame of the machine. Consequently, there is relatively little structural complication.

In an alternative embodiment, provision is made not for the axis of pivot extending substantially at right angles to the direction of travel to be tilted relative to the vertical longitudinal side of the frame of the machine but for the ladder which is pivotable about the axis of pivot to be so arranged that the axis of pivot does not stand in an orthogonal position on the plane defined by the ladder and instead the axis of pivot is in an oblique position to the plane of the ladder in such a way that in the vertical position the ladder is at a slope relative to the longitudinal side of the frame of the machine.

In a further embodiment which is a particular preference, there is provided, for fastening the ladder to the longitudinal side of the frame of the machine, a connecting joint which has two parts which are rotatable about an axis of rotation extending substantially at right angles to the direction of travel, the frame of the machine having one part of the joint and the ladder having the other part.

The axis of rotation of the connecting joint may, in this case, once again be tilted relative to a longitudinal side of the frame of the machine, thus causing the ladder to be at a slope relative to the longitudinal side of the machine. Once again, it is also possible for the connecting joint to be so arranged that the axis of rotation is perpendicular to the frame of the machine, though the ladder then has to be arranged on the part of the joint which the ladder has in such a way that the ladder is at a slope relative to the frame of the machine.

Basically, a tilted position for the ladder relative to the frame of the machine when in the vertical position has the disadvantage that when being pivoted the ladder does not move in a plane which extends parallel to the longitudinal side of the frame of the machine. There is therefore in principle a risk of the ladder colliding with parts of the frame of the machine when it is being pivoted. In a further embodiment which is a particular preference, provision is therefore made for the axis of rotation of the connecting joint to be tilted relative to the longitudinal side of the frame of the machine, the part of the joint which the ladder has being arranged on the ladder in such a way that the axis of pivot stands in an oblique position on the plane defined by the ladder. What is achieved by this means is that the ladder has adequate clearance to move when being pivoted but on the other hand does not project too far from the frame of the machine, thus maintaining the maximum permitted width for transport of the machine.

The ladder is preferably mounted on a longitudinal side of the machine to be rotatable through a right angle from the vertical position, thus allowing the ladder to be pivoted from the vertical position to a horizontal position. However, in practice it may be enough for the ladder to be mounted on the frame of the machine to be pivotable through a smaller angle to enable it to move out of the way of obstacles which make an appearance in the working range.

The ladder is preferably resiliently preloaded to the horizontal position and/or the vertical position, thus making it easier for the ladder to move by pivoting to one position, to the other position or to both positions. The ladder is preferably resiliently preloaded to the horizontal position and/or the vertical position by a pneumatic strut which assists a pivoting movement in both directions, in which case the dead-centre point of the pneumatic strut may be selected in such a way that the ladder is more strongly preloaded in one of the two directions, or in other words that the pivoting movement is assisted at an earlier point in time in one of the two directions.

In a further preferred embodiment at least one sub-section of the ladder has a stile which is at the front in the direction of travel and a stile which is to the rear in the direction of travel, to which stiles rungs are fastened. Basically however the ladder may also take the form of a single-stiled ladder.

In a further preferred embodiment, provision is made for that stile of the ladder which is at the front in the direction of travel to be pivotably fastened to a longitudinal side of the frame of the machine whereas that stile of the ladder which is to the rear in the direction of travel has a stop member which, when the ladder is in the vertical position, is supported on a supporting member which is fastened to the longitudinal side of the machine. What is achieved in this way is that the ladder is securely locked to the frame of the machine when being climbed, but is at any time able to pivot about an axis extending at right angles to the direction of travel if it hits against an obstacle during forward travel.

In a further embodiment which is a particular preference, the ladder comprises a top and a bottom sub-section, with the bottom sub-section being fastened to the top sub-section to be pivotable, in the same plane as the top sub-section, about an axis which extends substantially at right angles to the direction of travel. In this way the ladder can be folded together easily without the ladder projecting outwards.

The top sub-section of the ladder preferably takes the form of a two-stiled ladder having a stile which is at the front in the direction of travel and a stile which is to the rear, to which stiles rungs are fastened. It is advantageous in this case for the axis of pivot of the bottom sub-section of the ladder to be arranged at that stile of the top sub-section of the ladder which is to the rear in the direction of travel, meaning that the bottom sub-section of the ladder is pivoted if it hits against an obstacle during backward travel.

The bottom sub-section of the ladder preferably takes the form of a single-stiled ladder having one rung fastened to one stile. The stile of the bottom sub-section of the ladder can preferably be pivoted from a folded out position to a position in which it is folded in against the top sub-section and in which the rung of the bottom sub-section rests against the other of the two stiles of the top sub-section.

A particular compact structure can be obtained by having the bottom portion of that stile of the top sub-section of the ladder against which the rung of the bottom sub-section rests in the folded-in position extend obliquely to the other stile of the top sub-section, thus causing the rung of the bottom sub-section not to project laterally when folded against the stile of the top sub-section.

In the folded-out position, the bottom sub-section of the ladder is securely held by a stop member which is supported against the top sub-section of the ladder. In the folded-in position, the bottom sub-section of the ladder can preferably be locked to the top sub-section by a fastening member. The fastening member may be a fastening member which locks the bottom sub-section in the folded-in position by a snap or latching action and which can easily be released to allow the bottom sub-section to be folded out.

To make the climb to the driver's position easier, the ladder preferably has a hand-hold member which projects upwards beyond the ladder in the vertical position and which the driver of the machine can use to hold himself secure when climbing the ladder. The hand-hold member may be of different forms. It may also act as a safeguard against falling-off sideways. As well as performing its safety function, the hand-hold member may also serve as a lever for pivoting the ladder from the vertical position to the horizontal position or vice versa.

BRIEF DESCRIPTION OF THE DRAWINGS

An embodiment of the invention is explained in detail below by reference to the drawings. In the drawings:

FIG. 4 is a view of the ladder from the side, showing the bottom sub-section of the ladder folded in, FIG. 5 is a plan view of the ladder, showing the bottom sub-section of the ladder folded in, FIG. 6 is a view of the ladder from the side, showing the ladder folded upwards and the bottom sub-section of the ladder folded in, FIG. 7 is a plan view of the ladder, showing the ladder folded upwards and the bottom sub-section of the ladder folded in.

DETAILED DESCRIPTION

Figure 1:
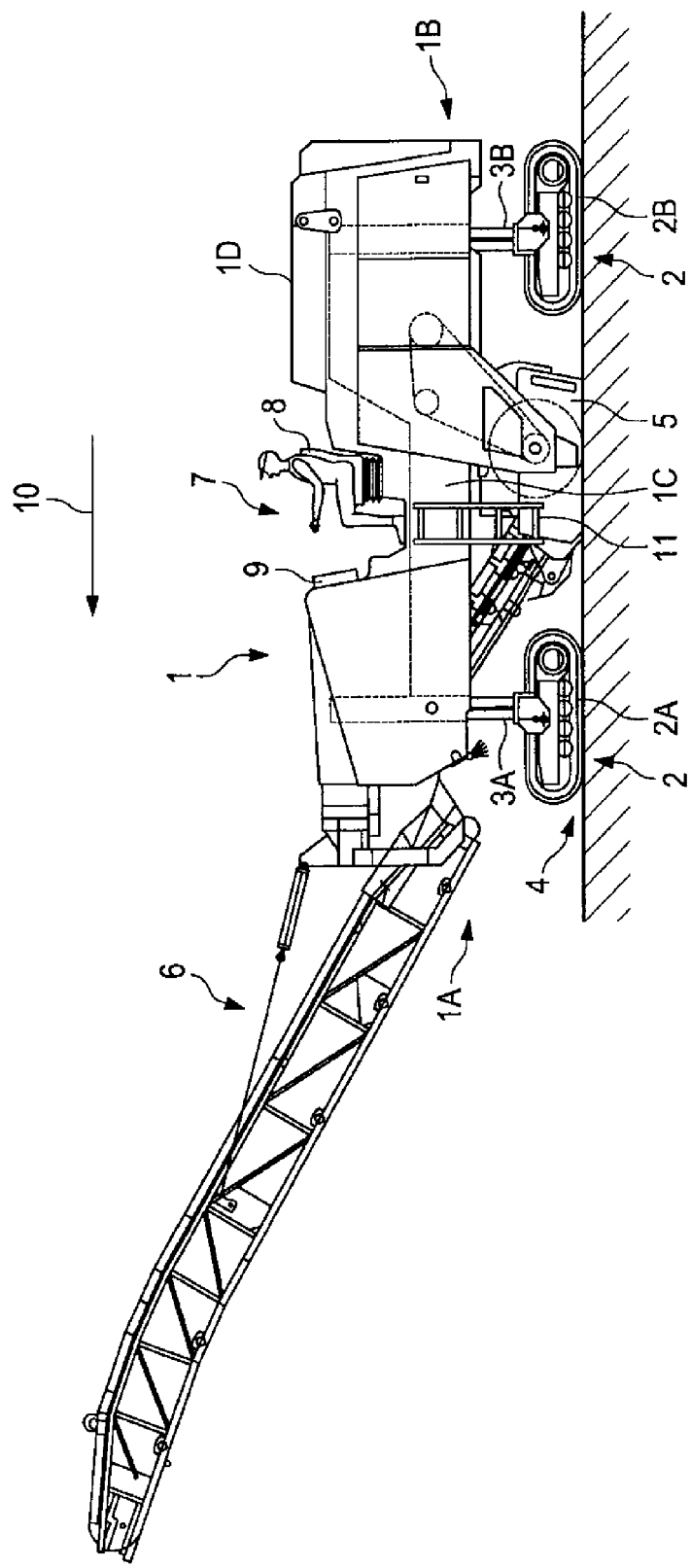
FIG. 1 is a simplified view of an embodiment of road-milling machine.

FIG. 1 shows the principal components of a road-milling machine which has a driver's position. The road-milling machine has a frame 1 and running gear 2. The running gear 2 of the milling machine comprises four track-laying units 2A, 2B which are arranged at the front and rear ends on the two sides of the frame 1 of the machine. The frame 1 of the machine and the running gear 2 are connected together by means of piston-and-cylinder arrangements 3A, 3B, thus allowing each track-laying unit to be adjusted in the heightwise direction. The track-laying units 2A, 2B may also be referred to simply as tracks. The road-milling machine may also use wheels instead of tracks. The tracks or wheels may generally be referred to as ground engaging supports.

The frame 1 of the milling machine carries a milling arrangement 5 which is arranged below the frame of the machine and a feeding arrangement 6 for the milled-away material which is arranged at the front end of the frame of the machine. Milling arrangement 5 may also be referred to as a milling drum. Feeding arrangement 6 may also be referred to as a conveyor.

The driver's position 7 on the milling machine is situated above the surface being worked on, in the centre of the frame 1 of the machine. At the driver's position, the driver of the machine sits in front of the controls 9 on a driver's seat 8.

The frame 1 of the machine has an end 1A which is at the front in the direction of travel 10, a rear end 1B and two longitudinal sides 1C, 1D. Fastened to at least one of the two longitudinal sides 1C or 1D of the frame 1 of the machine, below the driver's position 7, is a ladder 11 to enable the driver of the machine to climb to the driver's position easily. FIG. 1 shows an embodiment in which the ladder 11, which is only shown in a general form, is situated on the side which is on the left in the direction of travel 10. The ladder 11 will be described in detail below by reference to FIGS. 2 to 7.

Figure 2:
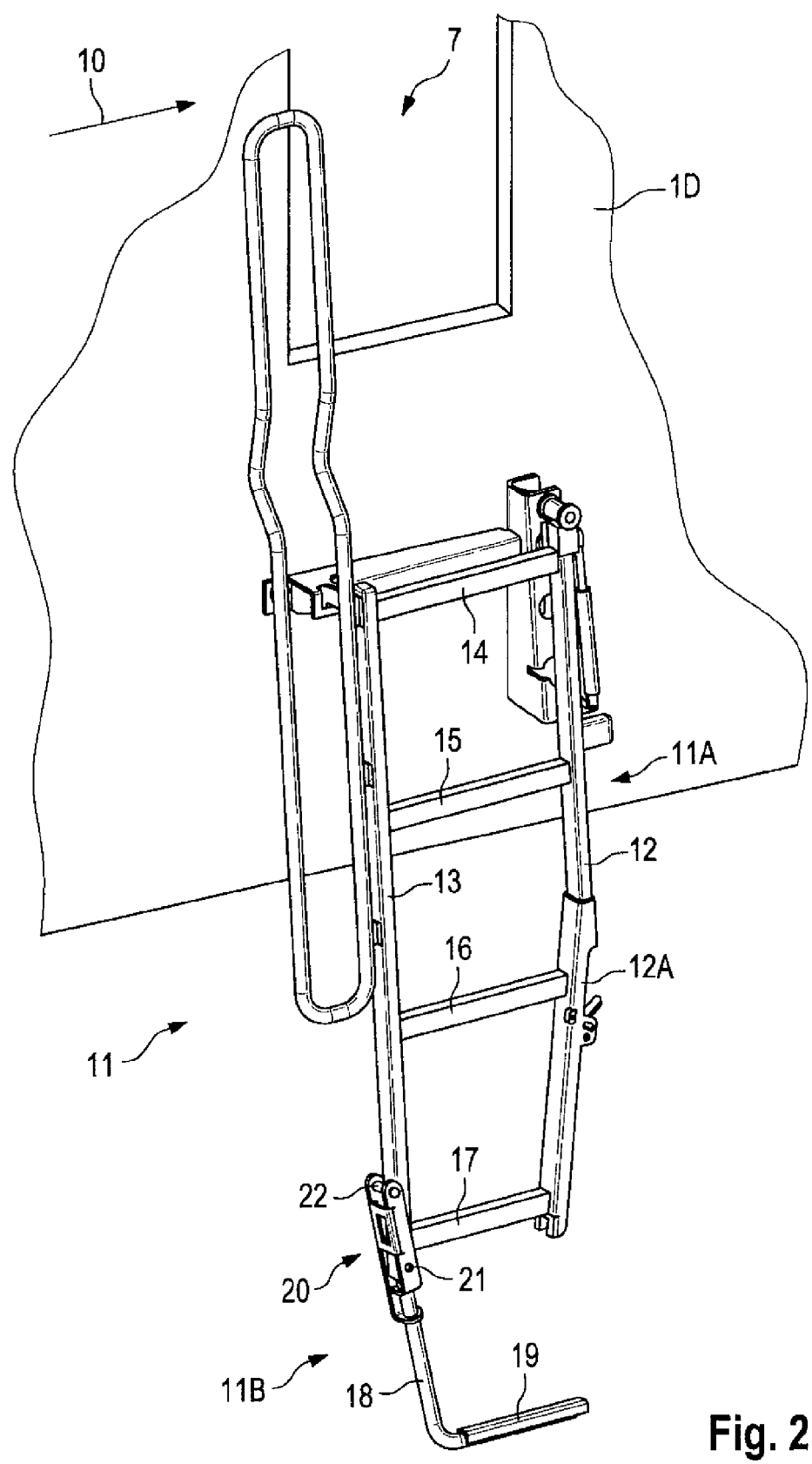
FIG. 2 is a view from the front of an embodiment of ladder according to the invention for the road-milling machine, showing the bottom sub-section of the ladder folded out.

FIG. 2 is a view from the front of the ladder 11 which is mounted on the longitudinal side 1D of the frame 1 of the machine. The ladder 11 extends from the entrance to the driver's position 7 to a point close to the ground. FIG. 1 shows the ladder in the vertical position. The driver of the machine is able to pivot the ladder from the vertical position through 90° to a horizontal position regardless of whether he is standing on the ground next to the machine or is at the driver's position 7.

The driver of the machine will pivot the ladder to the horizontal position when the working range of the machine is to be extended in the sideways direction, such for example as when milling is to be done to a point close to an adjoining wall, or when transportation is imminent. The driver of the machine will also pivot the ladder to the horizontal position when obstacles are expected. However, even if the driver of the machine has not pivoted the ladder to the horizontal position, the ladder can move out of the way of an obstacle which suddenly makes its appearance by pivoting out of the vertical position in the opposite direction to the direction of travel when it hits against the obstacle.

The ladder 11 has a top sub-section 11A and a bottom sub-section 11B. The top sub-section 11A of the ladder 11 has a stile 12 which is at the front in the direction of travel 10 and a stile 13 which is to the rear in the direction of travel, to which stiles 12, 13 four rungs 14, 15, 16, 17 are fastened, the bottom sub-section 11B of the ladder 11 having only one stile 18, which is to the rear in the direction of travel, and only one rung 19.

Figure 3:
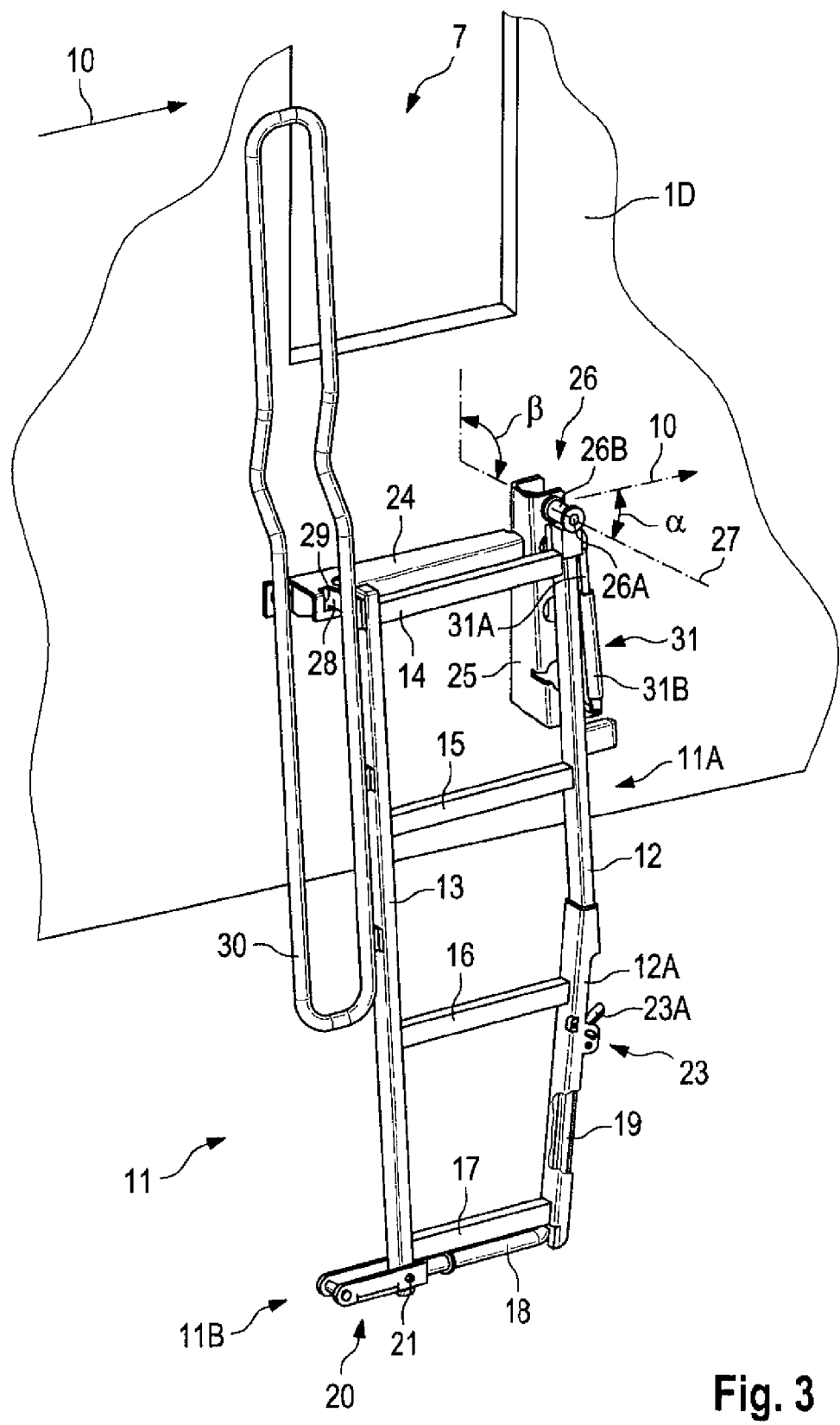
FIG. 3 is a view from the front of the ladder, showing the bottom sub-section folded against the top sub-section.

The bottom sub-section 11B of the ladder can be pivoted upwards from the position shown in FIG. 2 to the position shown in FIG. 3. The driver of the machine will fold the bottom sub-section 11B of the ladder 11 upwards when for example milling is to be done close to a kerb. There is thus no need for the entire ladder 11 to be folded upwards. Only the bottom sub-section 11B will also be folded upwards when the obstacles expected are only small. However, should the bottom sub-section not be folded upwards, the said bottom sub-section alone of the ladder can be pivoted during backward travel if the ladder hits against an obstacle by its bottom sub-section.

At the bottom end of the rear stile 13 of the top sub-section 11A of the ladder 11, the top end of the stile 18 of the bottom sub-section 11B of the ladder 11 is mounted to be pivotable about a pin (and axis) 21 which extends perpendicularly to a plane in which the stiles and rungs of the ladder 11 lie. In the folded-out position, the bottom sub-section 11B is supported laterally against the bottom portion of the rear stile 11 of the top sub-section 11A by a stop member 22.

When the bottom sub-section 11B of the ladder 11 is folded upwards, the stile 18 of the bottom sub-section 11B comes to rest against the bottom rung 17 of the top sub-section 11A and the rung 19 of the bottom sub-section 11B comes to rest against the bottom portion of the front stile 12 of the top sub-section 11A of the ladder 11 (FIG. 3). In the folded-in position, the bottom sub-section 11B of the ladder 11 can be fastened to the top sub-section 11A by a fastening member 23 which is arranged on the bottom portion 12A of the front stile 12 of the top sub-section 11A. The bottom sub-section 11B of the ladder 11 latches home automatically in this case when folded upwards. The latched connection can be released again by operating a lever 23A on the fastening member 23, thus causing the bottom sub-section 11B to drop back to the starting position under its own weight.

The bottom portion 12A of the front stile 12 of the top sub-section 11A extends obliquely downwards towards the rear stile 13 of the top sub-section 11A, which means that the rung 19 of the bottom sub-section 11A rests tightly against the bottom portion 12A of the front stile 12 or is received into it.

The ladder 11 is fastened, at a distance from the frame 1 of the machine, to a horizontal bracket 24 and a vertical bracket 25 on the frame of the machine by a connecting joint 26. The connecting joint 26 has two parts 26A and 26B which are rotatable relative to one another about an axis of rotation 27 and of which one, 26A, is fastened to the vertical bracket 25 on the frame 1 of the machine and the other, 26B, is fastened to the top end of the front stile 12 of the top sub-section 11A of the ladder 11.

Figure 4:
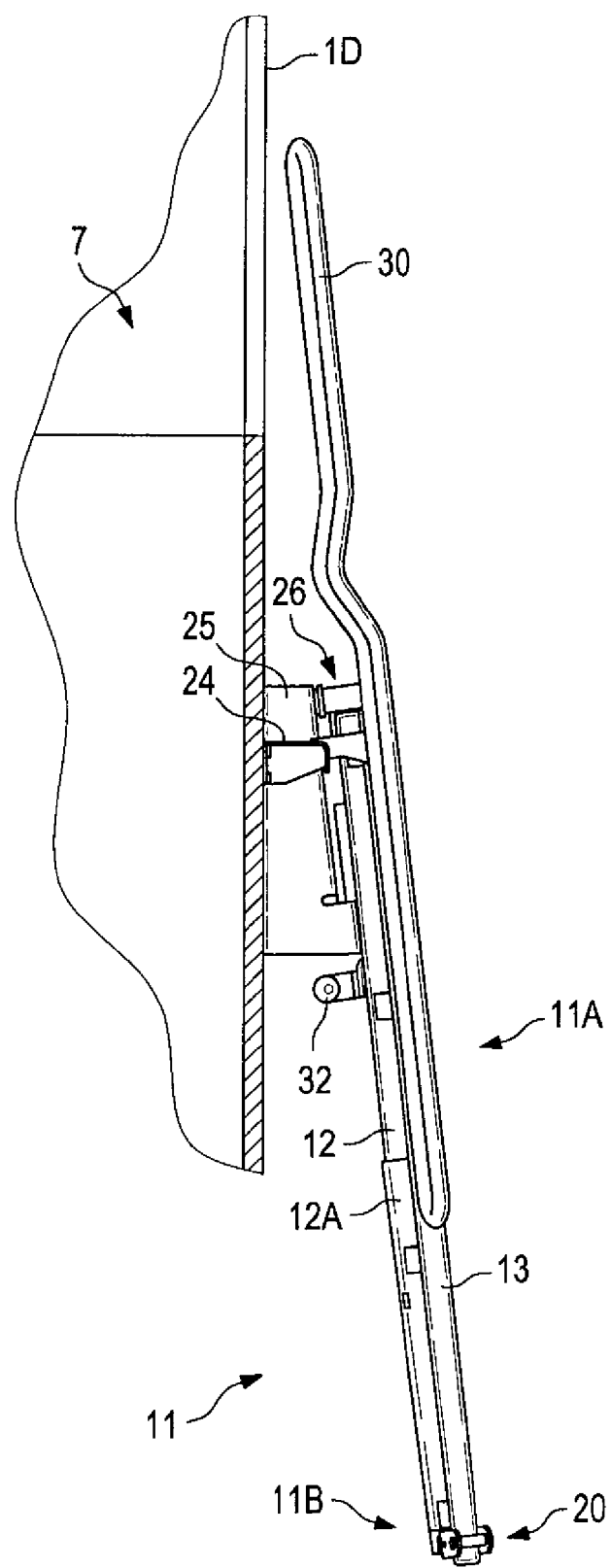
Figure 5:
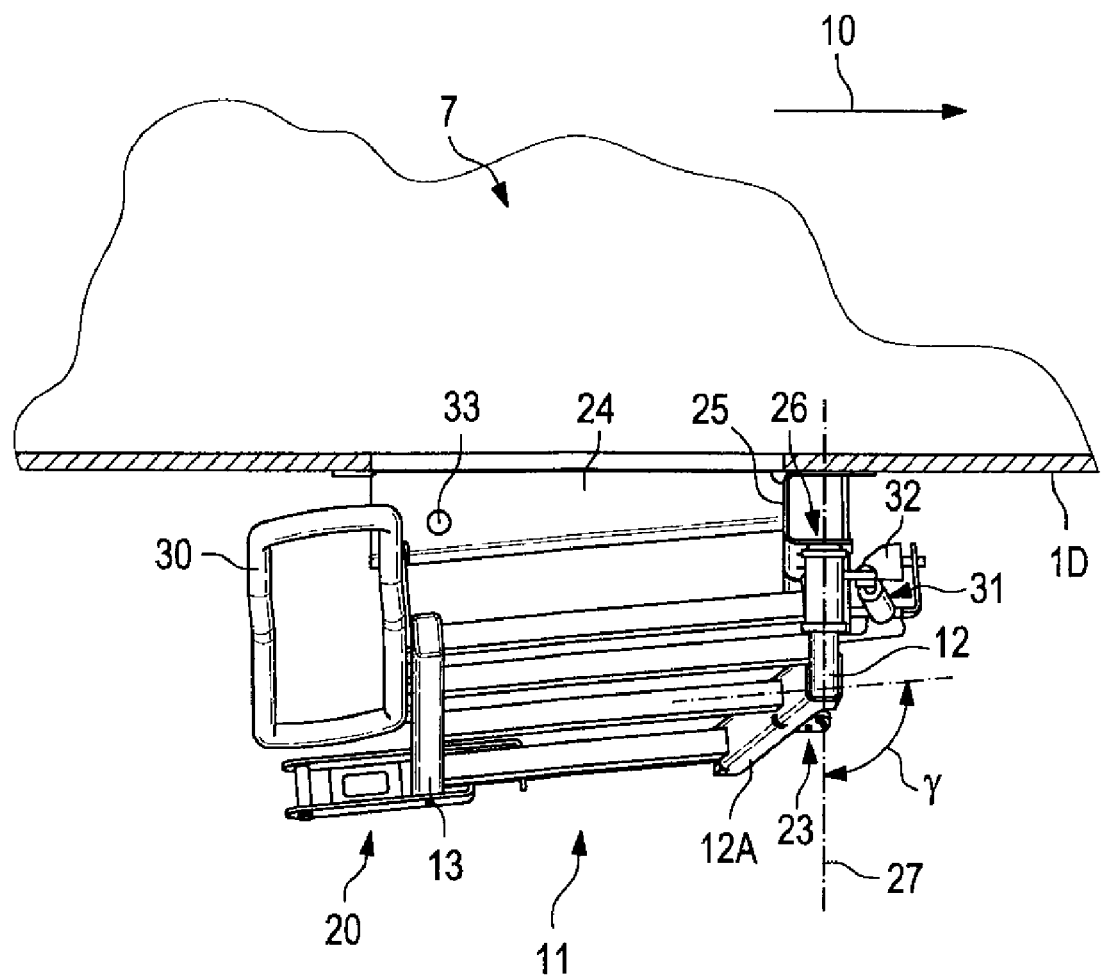
Figure 6:
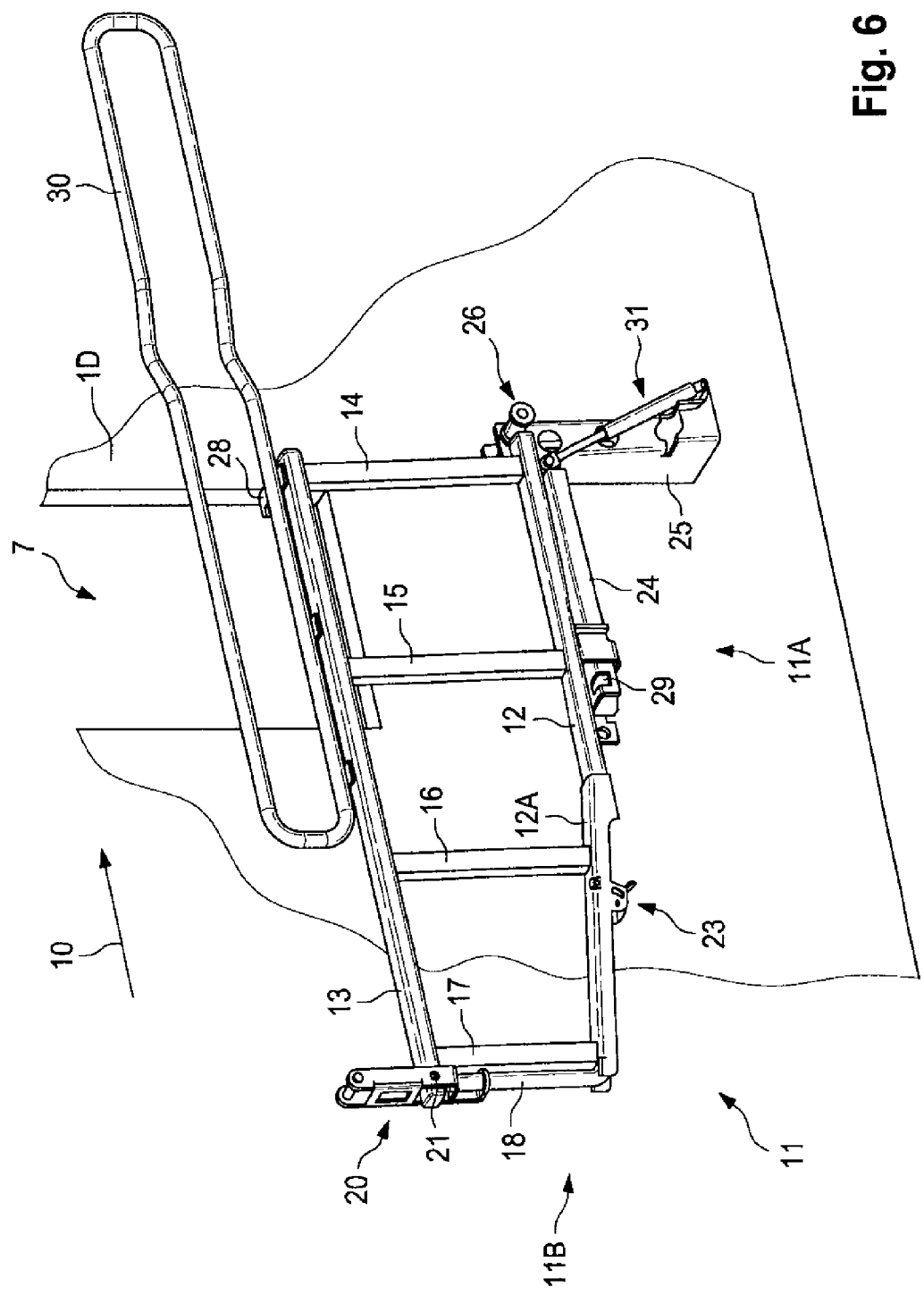

The axis of rotation 27 of the connecting joint 26 forms the axis of pivot about which the ladder can be pivoted on the frame of the machine from the vertical position to the horizontal position. The axis of pivot 27 makes a right angle $\alpha$ with the vertical side-wall 1D of the frame 1 of the machine, i.e. the axis of pivot extends at right angles to the direction of travel 10. At the same time, the axis of pivot 27 is tilted relative to the vertical side-wall 1D of the frame 1 of the machine at an angle $\beta$ which is less than 90°, which means that in the vertical position the ladder is at a slope relative to the frame of the machine (FIG. 3, FIG. 4). This ensures that ergonomic climbing aboard is possible and that there is an adequate spacing from the frame of the machine.

In principle, the tilted position of the axis of pivot 27 relative to the frame 1 of the machine at the angle β results in the ladder 11 not extending parallel to the side-wall ID when it is pivoted from the vertical position to the horizontal position and in its not resting close to the frame 1 of the machine but in its resting more closely to the side-wall at its top side than at its bottom side. There is therefore a risk of the ladder hitting against the frame of the machine when it is pivoted. Also, the tilted position of the ladder when folded upwards is found to be a nuisance in practice.

Figure 7:
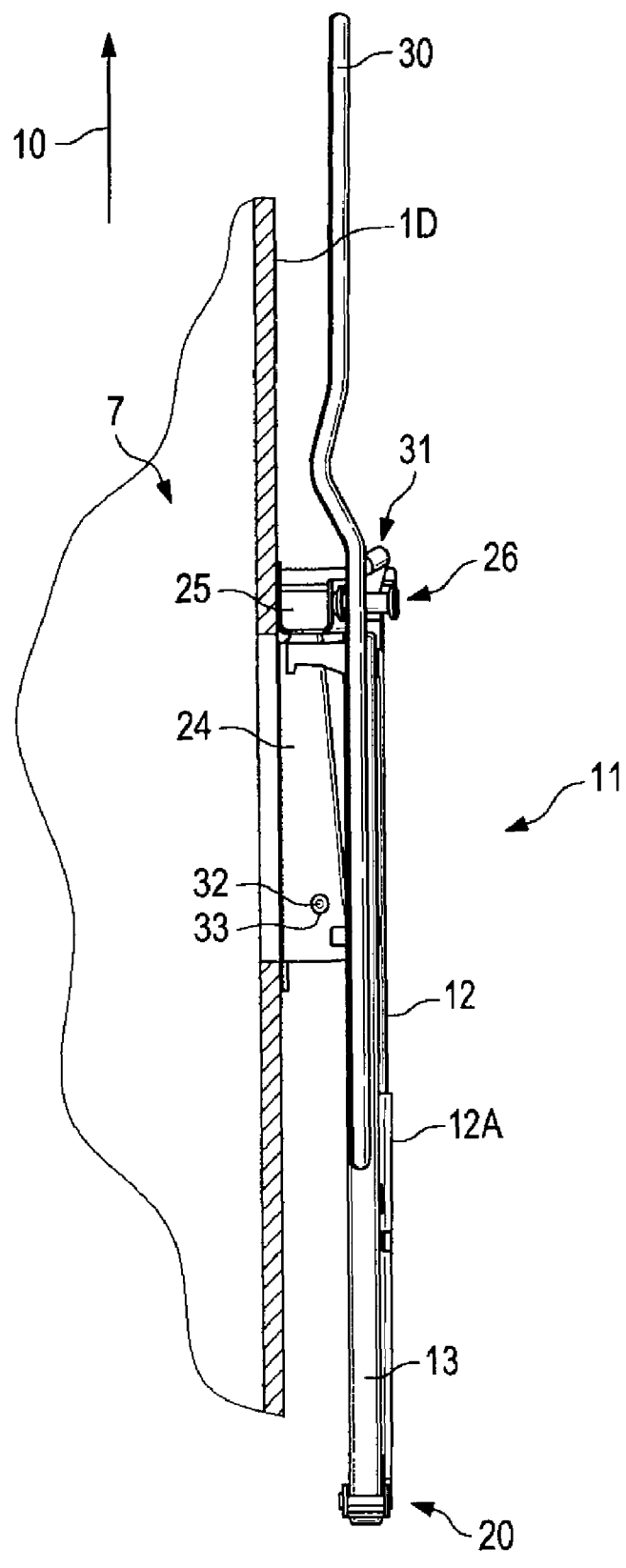

This problem is solved in the case of the ladder according to the invention by causing the axis of pivot 27 to be in an oblique position on the plane in which the stiles and rungs of the ladder 11 lie. The angle γ made by the axis of pivot 27 and the reference plane mentioned is more than 90°, because the stiles and rungs of the ladder 11 are rotated slightly relative to the side-wall ID of the frame 1 of the machine (FIG. 5), i.e. the plane of the ladder is inclined slightly inwards in the direction of travel 10. In constructional terms, this is achieved by fastening that part 26A of the connecting joint 26 which is connected to the ladder to the top end of the front stile 12 of the top sub-section 11A of the ladder 11 in a slightly oblique position. If the ladder 11 is then pivoted from the vertical position to the horizontal position, the ladder rests close to the side-wall ID of the frame 1 of the machine in the horizontal position (FIG. 7). The angles β and γ are so sized in this case that the ladder extends parallel to the longitudinal side of the frame of the machine in the horizontal position, i.e. points in the direction of travel 10.

Alternatively, in a kind of kinematic reversal, the angle β may equally well be set at 90° and that part 26A of the connecting joint 26 which is connected to the ladder may be fastened to the top end of the front stile 12 of the top sub-section 11A of the ladder 11 in an oblique position such that in the vertical position the ladder is sloped forward in the direction of ascent relative to the side-wall ID of the frame 1 of the machine. The angle a then has to be selected to be suitably larger than 90°, in such a way that the ladder rests close to the longitudinal side ID of the frame 1 of the machine in the horizontal position.

The ladder 11 which is pivotably mounted on the frame of the machine at one end is held in the vertical position by virtue of the fact that the ladder is supported on the horizontal bracket 24 on the frame 1 of the machine by a stop member 28. The stop member 28 is fastened to the top end of the rear stile 13 of the top sub-section 11A of the ladder 11. It takes the form of a hook and engages in a recess 29 in the horizontal bracket 24 on the frame 1 of the machine. If the ladder 11 encounters an obstacle during forward travel, it can easily pivot back, the hook-shaped stop member 28 then lifting away from the bracket 24. In the vertical position however, the stop member 28 fits behind the front edge of the bracket 24, which means that the ladder 11 is adequately secured.

The ladder is held in the horizontal position in a similar way in that it is supported, in a hole 33 in the horizontal bracket 24 on the frame 1 of the machine, by a damping stop 32. The damping stop 32 is fastened to the front stile 12 of the top sub-section 11A of the ladder 11. It takes the form of a parabolic buffer and engages in a hole 33 in the horizontal bracket 24 on the frame 1 of the machine. The ladder is thereby held in place with elastic damping in five of six possible directions. To rule out the possibility of mis-operation and misuse, the ladder 11 may also be locked in this position by suitable means.

Fastened to the longitudinal side of the rear stile 13 of the top sub-section 11A of the ladder 11 is an elongated hand-hold member 30 which in the vertical position extends beyond the top end of the ladder to a point above the driver's position 7. The hand-hold member 30 serves on the one hand as an aid to climbing aboard and on the other hand as a lever for pivoting the ladder between the vertical and horizontal positions. When the driver of the machine has climbed to the driver's position, he is able to pivot the ladder between the vertical and horizontal positions from the driver's position by taking hold of the hand-hold member 30. It goes without saying that the ladder can also be pivoted from the ground, e.g. to get the machine ready to be transported. For this purpose, the operator simply takes hold of the ladder 11 itself.

The pivoting movement of the ladder 11 between the vertical and horizontal positions and vice versa is assisted by a pneumatic strut 31 whose piston 31A is fastened to hinge to the front stile 12 of the top sub-section 11A above the axis of rotation 27 of the connecting joint 26 and whose cylinder 31B is fastened to hinge to the horizontal bracket 24 on the frame 1 of the machine below the axis of rotation 27 of the connecting joint 26.

What is claimed is:

1. Road-milling machine having a frame and running gear which has ground engaging supports which are arranged at the front and rear ends of the frame of the machine, having a milling drum which is arranged below the frame of the machine, and having a driver's position which is arranged between the ground engaging supports arranged at the front and rear ends, the road-milling machine having at least one ladder which is arranged on the frame of the machine below the driver's position, characterized in that the ladder is mounted on a longitudinal side of the frame of the machine to be pivotable from a substantially vertical position about an axis of pivot extending substantially at right angles to the direction of travel;

wherein at least one sub-section of the ladder has a stile which is at the front in the direction of travel and a stile which is to the rear in the direction of travel, to which stiles rungs are fastened, that stile of the ladder which is at the front in the direction of travel being pivotably fastened to the longitudinal side of the frame of the machine; and wherein the stile of the ladder which is at the front in the direction of travel has a damping stop which, when the ladder is in the horizontal position, is supported and located in a hole which is provided in a supporting member on the longitudinal side of the frame of the machine.

2. Road-milling machine according to claim 1, characterized in that the ladder is mounted on the longitudinal side of the frame of the machine to be pivotable, in such a way that that part of the ladder which is situated below the axis of pivot can be pivoted in the opposite direction to the direction of travel.

3. Road-milling machine according to claim 1, characterized in that the axis of pivot extending substantially at right angles to the direction of travel is tilted from the horizontal relative to the longitudinal side of the frame of the machine, thus causing the ladder to be at a slope relative to the longitudinal side of the frame of the machine in the vertical position.

4. Road-milling machine according to claim 1, characterized in that the axis of pivot of the ladder is in an oblique position relative to the plane defined by the ladder, thus causing the ladder to be at a slope relative to the longitudinal side of the frame of the machine in the vertical position.

5. Road-milling machine according to claim 1, characterized in that a connecting joint is provided which has two parts which are rotatable relative to one another about an axis of rotation extending substantially at right angles to the direction of travel, the frame of the machine having one part of the joint and the ladder having the other part.

6. Road-milling machine according to claim 5, characterized in that the part of the joint which the ladder has is arranged on the ladder in such a way that the axis of rotation of the connecting joint extends obliquely to a plane in which the ladder lies, thus causing the ladder to rest close to a longitudinal side of the frame of the machine when pivoted from the vertical position.

7. Road-milling machine according to claim 1, characterized in that the ladder is mounted on the longitudinal side of the frame of the machine to be rotatable through substantially a right angle from the vertical position, thus allowing the ladder to be pivoted from the vertical position to a horizontal position.

8. Road-milling machine according to claim 7, characterized in that the ladder is resiliently preloaded to the horizontal position and/or the vertical position.

9. Road-milling machine according to claim 1, characterized in that that stile of the ladder which is to the rear in the direction of travel has a stop member which, when the ladder is in the vertical position, is supported on a supporting member which is fastened to the longitudinal side of the frame of the machine.

10. Road-milling machine according to claim 1, characterized in that the ladder has a top and a bottom sub-section, the bottom sub-section being pivotably fastened to the top sub-section.

11. Road-milling machine according to claim 10, characterized in that the top sub-section of the ladder is the at least one sub-section, and the bottom sub-section of the ladder has one rung which is fastened to one stile, the stile of the bottom sub-section being pivotable from a folded out position to a position in which it is folded in against the top sub-section and in which the rung of the bottom sub-section rests against the front stile of the top sub-section.

12. Road-milling machine according to claim 11, characterized in that the bottom sub-section of the ladder has a fastening member by which the bottom sub-section of the ladder can be locked to the top sub-section in the folded-in position.

13. Road-milling machine according to claim 1, characterized in that the ladder has a hand-hold member which projects upwards beyond the ladder in the vertical position.

14. A construction machine apparatus, comprising:
a frame having a front end and a rear end, and having first and second longitudinal sides;
front and rear ground engaging supports connected to the frame for supporting the frame from the ground;
a ground working implement supported from the frame and extending below the frame;
a driver's position located between the front and rear ground engaging supports;
at least one ladder pivotally mounted on one of the longitudinal sides of the frame about a pivotal axis, the ladder being pivotal about the pivotal axis between a first substantially vertical position and a second position, the ladder including a lower portion extending below the pivotal axis when the ladder is in its substantially vertical first position, the lower portion pivoting rearward when the ladder pivots from its first position to its second position, so that when the apparatus is moving in a forward direction if the lower portion of the ladder strikes an obstacle the lower portion of the ladder can pivot rearward relative to the frame.

15. The apparatus of claim 14, wherein:
the ladder includes a top sub-section and a bottom sub-section;
the ladder includes a pivotal connection between the top sub-section and the one longitudinal side of the frame, the pivotal connection defining the pivotal axis; and
the bottom sub-section is pivotally connected to the top sub-section about a second pivotal axis, the bottom sub-section being pivotal relative to the top sub-section between an extended operating position and a folded-up position, the bottom sub-section moving forward relative to the frame when the ladder is in its substantially vertical first position and the bottom sub-section is pivoted from its extended operating position to its folded up position, so that when the apparatus is moving in a rearward direction if the lower sub-section strikes an obstacle the lower sub-section can pivot forward relative to the upper sub-section.

16. The apparatus of claim 15, wherein:
the top sub-section includes a front stile, a rear stile and a plurality of rungs extending between the front and rear stiles, and the pivotal connection is between the front stile and the one longitudinally extending side of the frame;
the bottom sub-section includes only one stile and only one rung, the only one stile of the bottom sub-section being pivotally connected to the rear stile of the top sub-section; and
when the bottom sub-section is in its folded-up position, the only one rung of the bottom sub-section engages the front stile of the top sub-section.

17. The apparatus of claim 16, further comprising:
a hand hold member attached to the rear stile of the top sub-section and extending upward when the ladder is in its substantially vertical first position.

18. The apparatus of claim 16, wherein:
the pivotal axis is substantially at a right angle to a direction of travel of the apparatus.

19. The apparatus of claim 18, wherein:
the ladder is mounted on the frame such that when the ladder is in its substantially vertical first position, an upper end of the ladder is tilted toward the frame.

20. The apparatus of claim 19, wherein:
the ladder is mounted on the frame such that when the ladder is in its second position the ladder is oriented substantially horizontally and substantially parallel to the longitudinal side of the frame on which the ladder is mounted.

21. Road-milling machine having a frame and running gear which has ground engaging supports which are arranged at the front and rear ends of the frame of the machine, having a milling drum which is arranged below the frame of the machine, and having a driver's position which is arranged between the ground engaging supports arranged at the front and rear ends, the road-milling machine having at least one ladder which is arranged on the frame of the machine below the driver's position, characterized in that the ladder is mounted on a longitudinal side of the frame of the machine to be pivotable from a substantially vertical position about an axis of pivot extending substantially at right angles to the direction of travel;
wherein the ladder has a top and a bottom sub-section, the bottom sub-section being pivotably fastened to the top sub-section; and wherein the top sub-section of the ladder has a front stile which is at the front in the direction of travel and a rear stile which is to the rear in the direction of travel, to which stiles rungs are fastened, and the bottom sub-section of the ladder has one rung which is fastened to one stile, the stile of the bottom sub-section being pivotable from a folded out position to a position in which it is folded in against the top sub-section and in which the rung of the bottom sub-section rests against the front stile of the top sub-section.

\* \* \* \* \*